(12) United States Patent
Shimomura et al.

(10) Patent No.: US 8,011,672 B2
(45) Date of Patent: Sep. 6, 2011

(54) INSTALLATION STRUCTURE FOR LIP TYPE SEAL

(75) Inventors: Takao Shimomura, Tokyo (JP); Hideki Tomoto, Tokyo (JP); Masamitsu Sanada, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 12/677,029

(22) PCT Filed: Sep. 2, 2008

(86) PCT No.: PCT/JP2008/065704
§ 371 (c)(1),
(2), (4) Date: Mar. 8, 2010

(87) PCT Pub. No.: WO2009/034871
PCT Pub. Date: Mar. 19, 2009

(65) Prior Publication Data
US 2010/0320698 A1 Dec. 23, 2010

(30) Foreign Application Priority Data
Sep. 14, 2007 (JP) ................................. 2007-007171

(51) Int. Cl.
*F16J 15/32* (2006.01)

(52) U.S. Cl. ...................................... 277/551; 277/572

(58) Field of Classification Search .......... 277/572–574, 277/576–577, 551
See application file for complete search history.

(56) References Cited

U.S. PATENT DOCUMENTS

| | | | | |
|---|---|---|---|---|
| 3,276,783 A * | 10/1966 | McKinven, Jr. | ............... | 277/562 |
| 3,338,584 A * | 8/1967 | Nakanishi et al. | ............ | 277/565 |
| 3,494,682 A * | 2/1970 | Keller | ............ | 277/551 |
| 3,612,547 A * | 10/1971 | Kan | .............. | 277/563 |
| 3,741,615 A * | 6/1973 | Otto | ............. | 384/486 |
| 4,470,605 A | 9/1984 | Deuring | | |
| 4,696,479 A * | 9/1987 | Karcher | ............ | 277/353 |
| 4,848,776 A * | 7/1989 | Winckler | ............ | 277/349 |
| 5,582,412 A * | 12/1996 | Sabo Filho | ............ | 277/565 |
| 5,845,910 A * | 12/1998 | Sabo | ............ | 277/553 |
| 2002/0017760 A1 | 2/2002 | Pataille et al. | | |

FOREIGN PATENT DOCUMENTS

| | | |
|---|---|---|
| EP | 0116721 A1 | 8/1984 |
| EP | 1156241 A2 | 11/2001 |
| JP | S59-137664 A | 8/1984 |
| JP | S63-43873 U | 3/1988 |
| JP | 08-075008 A | 3/1996 |

(Continued)

*Primary Examiner* — Vishal Patel
(74) *Attorney, Agent, or Firm* — Harness, Dickey & Pierce, P.L.C.

(57) ABSTRACT

To enable to use a lip type seal at installation positions where shaft diameters are same but shaft hole diameters are different, an installation structure is made such that a lip type seal (1) is installed to an inner periphery of a shaft hole (72) via a cartridge (51) arranged at an outer peripheral side of the lip type seal, the cartridge (51) has a large-diameter tube portion (54) and a small-diameter tube portion (52) via a step portion (53), and is fitted to the inner periphery of the shaft hole (72) by an outer peripheral surface of the large-diameter tube portion (54), while the lip type seal (1) is fitted to an inner peripheral surface of the small-diameter tube portion (52), and only a diameter of the large-diameter tube portion (54) is set in conformity to a diameter of a shaft hole to be installed.

4 Claims, 3 Drawing Sheets

FOREIGN PATENT DOCUMENTS

| | | |
|---|---|---|
| JP | 9-112704 A | 5/1997 |
| JP | 11-351385 A | 12/1999 |
| JP | 2001-280510 A | 10/2001 |
| JP | 2002-013643 A | 1/2002 |
| JP | 2003-042304 A | 2/2003 |
| WO | WO 2004094877 A2 * | 11/2004 |

* cited by examiner

INSTALLATION STRUCTURE FOR LIP TYPE SEAL

CROSS-REFERENCE TO RELATED APPLICATIONS

This is a national stage of International Application No. PCT/JP2008/065704 filed on Sep. 2, 2008 and published in the Japanese language. This application claims the benefit of Japanese Application No. 2007-007171, filed on Sep. 14, 2007. The disclosures of the above applications are incorporated herein by reference.

BACKGROUND OF THE INVENTION

1. Field of the Invention

The present invention relates to a lip type seal corresponding to one kind of a sealing apparatus, and more particularly to an installation structure thereof. The lip type seal in accordance with the present invention is used, for example, as a water pump seal for a vehicle such as a motor vehicle, or is used as another general purpose water pump seal.

2. Description of the Conventional Art

Conventionally, as shown in FIG. 3, there has been known a lip type seal 74 which is installed to an inner periphery of a shaft hole 72 of a housing 71, and slidably in close contact with a peripheral surface of a shaft 73 inserted to the shaft hole 72, however, an installation structure to an inner periphery of the shaft hole 72 is made such that an outer peripheral surface of the seal 74 is directly fitted to an inner peripheral surface of the shaft hole 72. Accordingly, in the case of using it at such an installation position where a diameter of a shaft is the same but a diameter of a shaft hole is different, there is a problem that it is necessary to independently manufacture a seal 74 having the different specification in which an outer diameter is differentiated (refer to Japanese Unexamined Patent Publication No. 8-75008).

Further, as another conventional art relating to the present invention, Japanese Unexamined Patent Publication No. 2003-42304 discloses a sealing apparatus having a retainer made of a sheet metal and attached to a housing such as a cylinder block of an engine or the like, and an oil seal retained by the sheet metal retainer and slidably in close contact with a rotating member such as a crank shaft or the like, in which the sheet metal retainer and the oil seal are independently formed from each other, and the oil seal is fitted to an inner periphery of the sheet metal retainer. However, in this conventional art, the sheet metal retainer is provided for installing the oil seal to an outer end surface of a housing, and is formed as a different structure from the present invention in which the cartridge is provided for installing the lip type seal to the inner periphery of the shaft hole (refer to Japanese Unexamined Patent Publication No. 2003-42304).

SUMMARY OF THE INVENTION

Problem to be Solved by the Invention

The present invention is made by taking the points mentioned above into consideration, and an object of the present invention is to provide an installation structure of a lip type seal which is ingeniously devised so that a lip type seal having a fixed specification can be used as it is even in the case of being used at installation positions where diameters of shafts are same but diameters of shaft holes are different.

Means for Solving the Problem

In order to achieve the object mentioned above, in accordance with a first aspect of the present invention, there is provided an installation structure which is installed to an inner periphery of a shaft hole of a housing for installing a lip type seal slidably in close contact with a peripheral surface of a shaft inserted to the shaft hole to the inner periphery of the shaft hole, wherein the installation structure is made such that the lip type seal is installed to the inner periphery of the shaft hole via a cartridge arranged at an outer peripheral side of the lip type seal, and the cartridge has a stepped shape obtained by integrally forming a large-diameter tube portion and a small-diameter tube portion via a step portion, and is fitted to the inner periphery of the shaft hole by an outer peripheral surface of the large-diameter tube portion, while the lip type seal is fitted to an inner peripheral surface of the small-diameter tube portion.

Further, in accordance with a second aspect of the present invention, there is provided an installation structure as recited in the first aspect, wherein the cartridge integrally has an outward flange shaped engagement portion for defining an insertion depth at a time of inserting the cartridge to the shaft hole on an end portion in an axial direction of the large-diameter tube portion, and integrally has an inward flange shaped engagement portion for defining an insertion depth at a time of inserting the lip type seal to the cartridge on an end portion in an axial direction of the small-diameter tube portion, and a gap in a radial direction is set between the outer peripheral surface of the small-diameter tube portion and the inner peripheral surface of the shaft hole at a time when the cartridge is fitted to the inner peripheral surface of the shaft hole by the outer peripheral surface of the large-diameter tube portion.

Further, in accordance with a third aspect of the present invention, there is provided an installation structure as recited in the first aspect or the second aspect mentioned above, wherein the step portion provided in the cartridge is formed in an S-shaped cross sectional shape, or an approximately S-shaped cross sectional shape, and the small-diameter tube portion and the large-diameter tube portion are arranged so as to partly overlap in the axial direction.

Further, in accordance with a fourth aspect of the present invention, there is provided an installation structure as recited in the first, second or third aspect mentioned above, wherein the cartridge has an outer peripheral seal constructed by an elastic membrane interposed between the cartridge and the inner periphery of the shaft hole to serve for a sealing operation, on the outer peripheral surface of the large-diameter tube portion.

Effect of the Invention

The installation structure in accordance with the present invention provided with the constitution mentioned above is made such that the lip type seal is installed to the inner periphery of the shaft hole via the cartridge arranged at the outer peripheral side of the lip type seal, and the cartridge has the stepped shape obtained by integrally forming the large-diameter tube portion and the small-diameter tube portion via the step portion, and is fitted to the inner periphery of the shaft hole by the outer peripheral surface of the large-diameter tube portion, while the lip type seal is fitted to the inner peripheral surface of the small-diameter tube portion. Accordingly, it is possible to go on using the lip type seal having a fixed specification as it is and further it is possible to install the lip type seal to inner peripheries of shaft holes having various magnitudes, by setting the diameter of the small-diameter tube portion in a fixed size and setting the diameter of the large-diameter tube portion in conformity to a diameter of a shaft hole to be installed, at a time of manufacturing the cartridge mentioned above. Therefore, in accordance with the object of the present invention, it is possible to use the lip type seal having a fixed specification as it is, even in the case of being used at installation positions where shaft diameters are same but shaft hole diameters are different.

Further, in the case that the outward flange shaped engagement portion is provided on the end portion in the axial direction of the large-diameter tube portion in the cartridge, it is possible to always define the insertion depth to a fixed depth by bringing the engagement portion into contact with the outer end surface of the housing at a time of inserting the cartridge to the shaft hole, whereby it is possible to improve an installing workability.

Further, in the case that the inward flange shaped engagement portion is provided on the end portion in the axial direction of the small-diameter tube portion in the cartridge, it is possible to always define the insertion depth to a fixed depth by bringing the lip type seal into contact with the engagement portion at a time of inserting the lip type seal to the cartridge, whereby it is possible to improve an assembling workability.

Further, as for the cartridge, the gap in the radial direction having the predetermined magnitude is set between the outer peripheral surface of the small-diameter tube portion and the inner peripheral surface of the shaft hole at a time when the cartridge is fitted to the inner peripheral surface of the shaft hole by the outer peripheral surface of the large-diameter tube portion, there can be considered to make an effective use of the gap in the radial direction as a space for the following of the lip type seal to an eccentricity of the shaft, or a space for heat insulation for making heat hard to be transmitted to the lip type seal from the housing.

Further, since the length in the axial direction of the cartridge is set by a sum of the length in the axial direction of the small-diameter tube portion and the length in the axial direction of the large-diameter tube portion, there is a risk that the cartridge is somewhat enlarged in size in the axial direction, however, since the step portion provided in the cartridge is formed in an S-shaped cross sectional shape or an approximately S-shaped cross sectional shape, and the small-diameter tube portion and the large-diameter tube portion are arranged so as to partly overlap in the axial direction, it is possible to shorten the length in the axial direction of the cartridge by a partly overlapping amount. Accordingly, even in the structure in which the lip type seal is installed via the cartridge, it is possible to provide the seal product having the compact structure in the axial direction.

Further, in the case that the outer peripheral seal constituted by the elastic membrane is provided on the outer peripheral surface of the large-diameter tube portion in the cartridge, the outer peripheral seal is interposed between the cartridge and the inner peripheral surface of the shaft hole so as to carry out sealing operation. Accordingly, it is possible to secure and improve the sealing performance of the portion.

DETAILED DESCRIPTION OF PREFERRED EMBODIMENTS

Next, a description will be given of embodiments in accordance with the present invention with reference to the accompanying drawings.

First Embodiment

Figure 1:
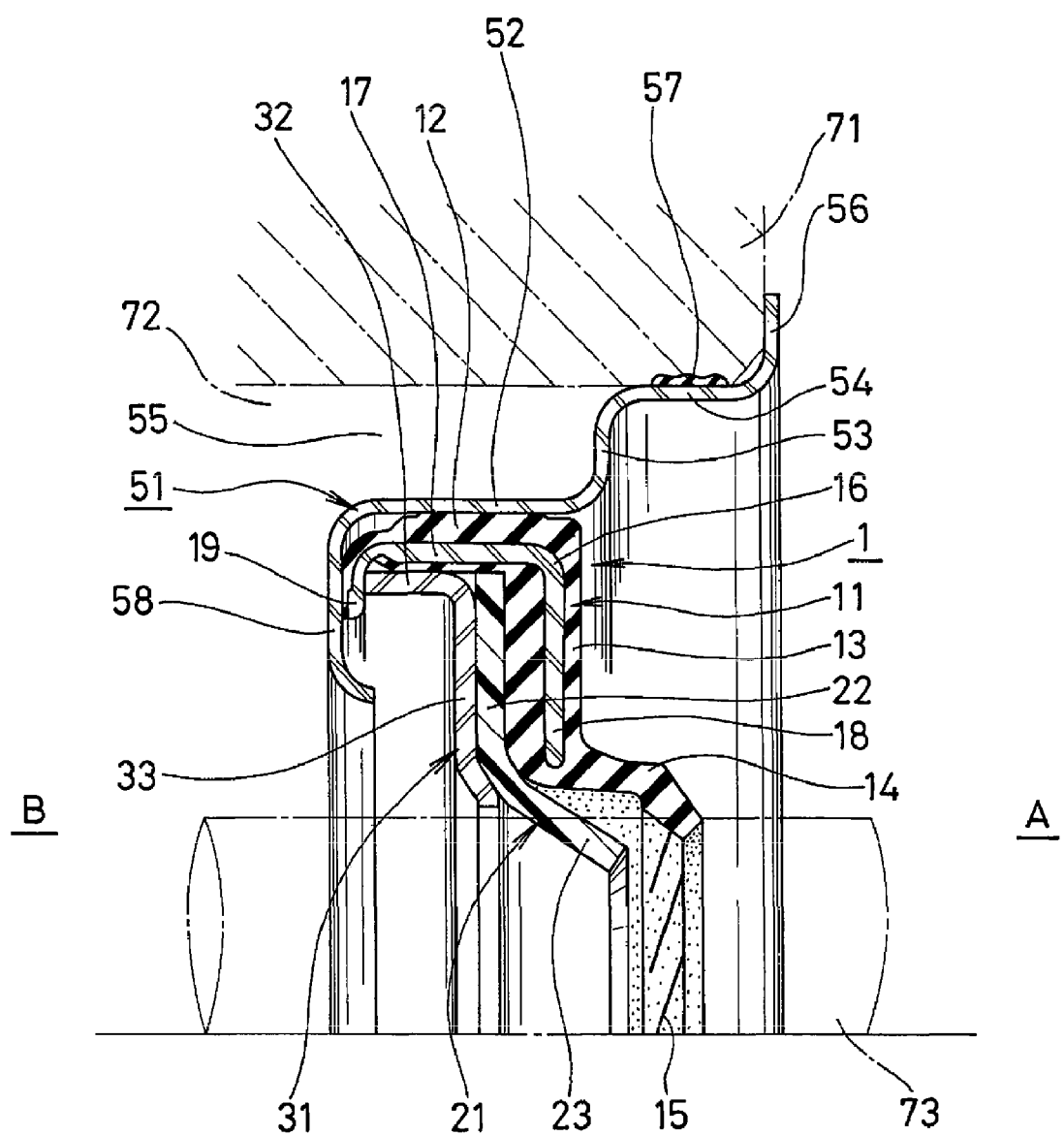
FIG. 1 is a half cross sectional view of a lip type seal provided with an installation structure in accordance with a first embodiment of the present invention.

FIG. 1 shows an installation structure of a lip type seal 1 in accordance with a first embodiment of the present invention, and the lip type seal 1 and the installation structure are respectively made as follows. In this case, the lip seal 1 is used to seal cooling water as a water pump seal for a motor vehicle. A right side of the drawing corresponds to cooling water, that is, a sealed fluid side A, and a left side of the drawing corresponds to an atmospheric air side B.

The lip type seal 1, which is structured such as to be installed to an inner periphery of a shaft hole (a bore) 72 of a housing (a pump housing) 71 and slidably in contact with a peripheral surface of a shaft 73 inserted to the shaft hole 72, is installed to an inner periphery of the shaft hole 72 via a cartridge 51 arranged at an outer peripheral side thereof.

Further, the lip type seal 1 is constructed by a combination of a first lip seal member 11, a second lip seal member 21 and a backup ring 31.

The first lip seal member 11 is constituted by a predetermined rubber-like elastic material, an annular radial portion 13 is integrally formed on an end portion at the sealed fluid side of a cylinder portion 12 toward an inner side in a radial direction, and a seal lip (a first seal lip) 14 is integrally formed on an inner peripheral end portion of the radial portion 13 toward one side in an axial direction. A screw seal 15 carrying out a pumping operation is provided on an inner peripheral surface of a lip end of the seal lip 14. Further, a reinforcing ring 16 made of a metal is embedded (adhered by vulcanization) within thicknesses of the cylinder portion 12 and the radial portion 13, and the reinforcing ring 16 integrally has a cylinder portion 17 and a radial portion 18 similarly to the first lip seal member 11. Further, a caulking portion 19 for caulking to fix the second lip seal member 21 and the backup ring 31 with respect to the radial portions 13 and 18 is integrally formed on the atmospheric air side end portion of the cylinder portion 17 of the reinforcing ring 16.

The second lip seal member 21 is made of a predetermined resin material (PTFE or the like), and a seal lip (a second seal lip) 23 is integrally formed on an inner peripheral end portion of an annular flat surface portion 22 toward one side in the axial direction.

The backup ring 31 is constituted by a press molded product of a metal sheet, an annular inward flange portion 33 is integrally formed on the sealed fluid side end portion of a tubular portion 32 toward an inner side in the radial direction, and the flange portion 33 is formed as a backup portion (a retaining portion) directly backing up the second lip seal member 21.

The second lip seal member 21 and the backup ring 31 are sequentially assembled at back surface sides of the radial portions 13 and 18 at an inner peripheral side of the cylinder portion 12 of the first lip seal member 11, as illustrated, and then the caulking portion 19 is bent, whereby three parts 11, 21 and 31 are integrated.

The lip type seal 1 constituted by a combination of those three parts 11, 21 and 31 can be directly fitted to an inner peripheral surface of a shaft hole 72, however, is structured such as to be fitted thereto via the cartridge 51 as mentioned above, in the installation structure mentioned above.

The cartridge 51 is structured as follows.

The cartridge 51 is made of a predetermined rigid material such as a metal or the like, for example, constituted by a press molded product of a metal sheet, and has a small-diameter tube portion 52, an annular step portion 53 is integrally formed on a sealed fluid side end portion of the small-diameter tube portion 52 toward an outer side in a radial direction, a large-diameter tube portion 54 is integrally formed on an outer peripheral end portion of the step portion 53 toward the sealed fluid side A, and the cartridge 51 is structured such as to be fitted to an inner peripheral surface of the shaft hole 72 by an outer peripheral surface of the large-diameter tube portion 54, while the lip type seal 1 is fitted to an inner peripheral surface of the small-diameter tube portion 52, as illustrated.

Further, the cartridge 51 is structured such that a diameter of the small-diameter tube portion 52 is set in a fixed size, and a diameter of the large-diameter tube portion 54 is set in conformity to a diameter of the shaft hole to be installed, at a time of manufacture thereof.

Further, the cartridge 51 is structured such that a radial gap 55 is set between the outer peripheral surface of the small-diameter tube portion 52 and the inner peripheral surface of the shaft hole 72 at a time when the cartridge 51 is fitted to the inner peripheral surface of the shaft hole 72 by the outer peripheral surface of the large-diameter tube portion 54.

Further, an outward flange-shaped engagement portion 56 for defining an insertion depth at a time of inserting the cartridge 51 to the shaft hole 72 is integrally formed on a sealed fluid side end portion of the large-diameter tube portion 54 in the cartridge 51.

Further, an outer peripheral seal 57 made of an elastic film is attached all around the periphery to the outer peripheral surface of the large-diameter tube portion 54 in the cartridge 51, the outer peripheral seal 57 being interposed between the cartridge 51 and the inner peripheral surface of the shaft hole 72 and carrying out a sealing operation.

Further, an inward flange-shaped engagement portion 58 for defining an insertion depth at a time of inserting the lip type seal 1 to the cartridge 51 is integrally formed on an atmospheric air side end portion of the small-diameter tube portion 52 in the cartridge 51.

The lip type seal 1 having the structure mentioned above has a plurality of seal lips 14 and 23 so as to achieve an excellent sealing effect, and the installation structure is characterized in a point that the following operation and effect can be achieved.

The installation structure having the constitution mentioned above is made such that the lip type seal 1 is installed to the inner periphery of the shaft hole 72 via the cartridge 51 arranged at the outer peripheral side of the lip type seal 1, and the cartridge 51 is formed in a stepped shape in which the large-diameter tube portion 54 is integrally formed with the small-diameter tube portion 52 via the step portion 53, and is fitted to the inner periphery of the shaft hole 72 by the outer peripheral surface of the large-diameter tube portion 54, while the lip type seal 1 is fitted to the inner peripheral surface of the small-diameter tube portion 52. Accordingly, it is possible to go on using the lip type seal 1 having a fixed specification as it is, and further, it is possible to install the lip type seal 1 to inner peripheries of shaft holes 72 having various magnitudes, by setting the diameter of the small-diameter tube portion 52 in a fixed size and setting the diameter of the large-diameter tube portion 54 in conformity to a diameter of a shaft hole to be installed, at a time of manufacturing the cartridge 51. Therefore, even in the case of using at installation positions having same shaft diameters but having a different shaft hole diameters, it is possible to use the lip type seal 1 having the fixed specification as it is.

Further, since the radial gap 55 having a predetermined magnitude is set between the outer peripheral surface of the small-diameter tube portion 52 of the cartridge 51 and the inner peripheral surface of the shaft hole 72 in the installed state, it is possible to make effective use of the radial gap 55 as a space for the following of the lip type seal 1 to an eccentricity of the shaft 73, or a space for heat insulation to make heat hard to be transmitted to the lip type seal 1 from the housing 71.

Further, since the outward flange-shaped engagement portion 56 is integrally formed on the sealed fluid side end portion of the large-diameter tube portion 54 in the cartridge 51, it is possible to always define an insertion depth at a fixed depth by bringing the engagement portion 56 into contact with the outer end surface of the housing 71 at a time of inserting the cartridge 51 to the shaft hole 72. Accordingly, it is possible to make an installing work easy and it is possible to improve installing workability.

Further, since the outer peripheral seal 57 constituted by the elastic membrane is attached to the outer peripheral surface of the large-diameter tube portion 54 in the cartridge 51, the outer peripheral seal 57 is interposed between the cartridge 51 and the inner peripheral surface of the shaft hole 72 so as to achieve a sealing operation. Accordingly, it is possible to secure and improve sealing performance of the portion.

Further, since the inward flange-shaped engagement portion 58 is integrally formed on the atmospheric air side end portion of the small-diameter tube portion 52 in the cartridge 51, it is possible to always define an insertion depth at a fixed depth by bringing the lip type seal 1 into contact with the engagement portion 58 at a time of inserting the lip type seal 1 to the cartridge 51. Accordingly, it is possible to make an assembling work easy, and it is possible to improve assembling workability.

Second Embodiment

Figure 2:
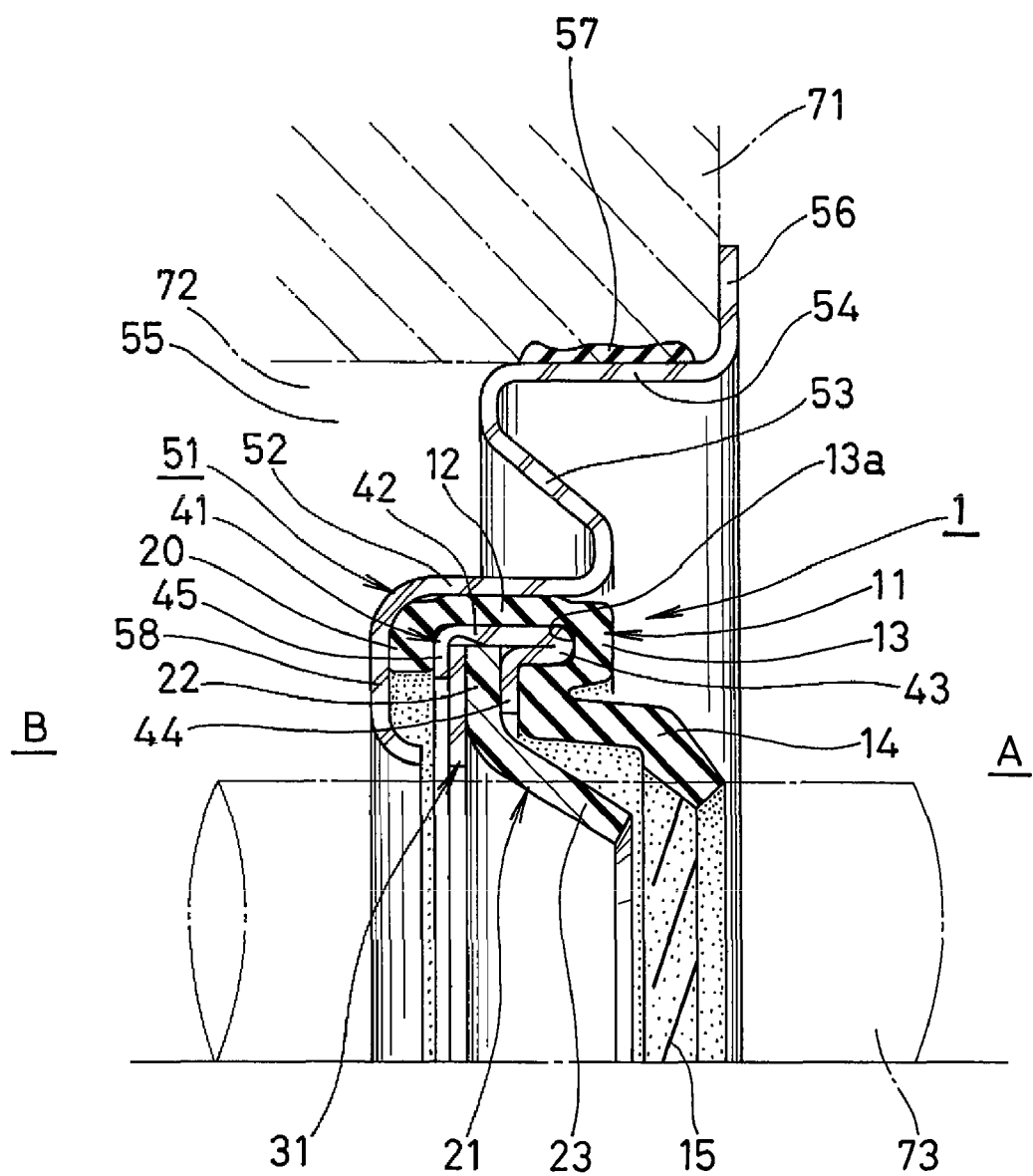
FIG. 2 is a half cross sectional view of a lip type seal provided with an installation structure in accordance with a second embodiment of the present invention.
Figure 3:
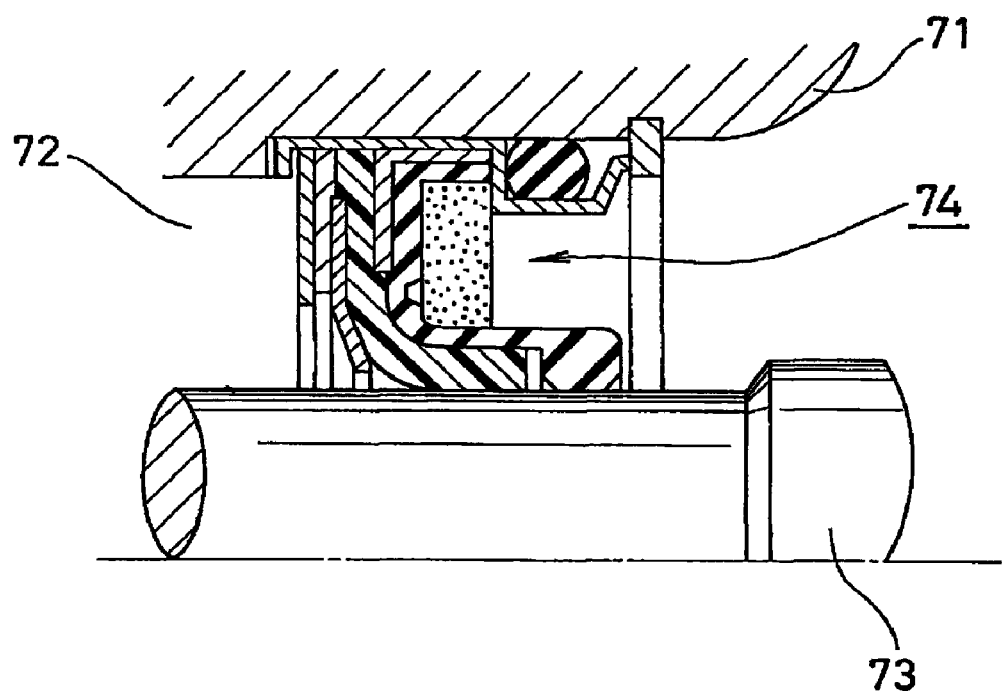
FIG. 3 is a half cross sectional view of a lip seal provided with an installation structure in accordance with a conventional art.

FIG. 2 shows an installation structure of a lip type seal 1 in accordance with a second embodiment of the present invention, and the lip type seal 1 and the installation structure are respectively made as follows. In this case, the lip type seal 1 is used to seal cooling water as a water pump seal for a motor vehicle. A right side of the drawing corresponds to cooling water, that is, a sealed fluid side A, and a left side of the drawing corresponds to an atmospheric air side B.

The lip type seal 1, which is structured such as to be installed to an inner periphery of a shaft hole (a bore) 72 of a housing (a pump housing) 71 and slidably in contact with a peripheral surface of a shaft 73 inserted to the shaft hole 72, is installed to an inner periphery of the shaft hole 72 via a cartridge 51 arranged in an outer peripheral side thereof.

Further, the lip type seal 1 is constructed by a combination of a first lip seal member 11, a second lip seal member 21, a backup ring 31 and a retaining ring 41.

First, the retaining ring 41 is constituted by a press molded product of a metal sheet, and integrally has a tubular portion 42, a fold-back portion 43 provided continuously to a sealed fluid side end portion of the tubular portion 42, an inward flange portion 44 provided continuously to the fold-back portion 43, and a caulking portion 45 provided on an atmospheric air side end portion of the tubular portion 42, and the second seal lip member 21 and the backup ring 31 are caulked and fixed between the inward flange portion 44 and the caulking portion 45.

The second lip seal member 21 is made of a predetermined resin material (PTFE or the like), and a seal lip (a second seal lip) 23 is integrally formed on an inner peripheral end portion of an annular flat surface portion 22 in such a manner as to slope to a sealed fluid side A.

The backup ring 31 is constituted by a press molded product of a metal sheet similarly to the retaining ring 41, is formed in an annular flat shape. Since the backup ring 31 is arranged further in an atmospheric air side B than the second lip seal member 21, the backup ring 31 carries out a backing up operation with respect to the second lip seal member 21.

The first lip seal member 11 is constituted by a predetermined rubber-like elastic material, and integrally has a cylinder portion 12 arranged at an outer peripheral side of the tubular portion 42 of the retaining ring 41, an annular radial portion 13 integrally formed from an end portion at the sealed fluid side of the cylinder portion 12 toward an inner side in a radial direction, and a seal lip (a first seal lip) 14 integrally formed on an inner peripheral end portion of the radial portion 13. The seal lip 14 is formed so as to extend long to the sealed fluid side A, and a screw seal 15 carrying out a pumping operation is provided on an inner peripheral surface of a tip end of the seal lip 14. Further, an annular fitting groove portion 13a is provided on an atmospheric air side end surface of the radial portion 13 so as to be open toward the atmospheric air side B, and a fold-back portion 43 of the retaining ring 41 is fitted to the fitting groove portion 13a from the atmospheric air side B. Further, an inward collar portion 20 is integrally formed on the atmospheric air side end portion of the cylinder portion 12, and the structure is made such that the retaining ring 41 is fitted in a non-bonded manner between the inward collar portion 20 and the radial portion 13.

The lip type seal 1 constituted by a combination of those four parts 11, 21, 31 and 41 can be directly fitted to an inner peripheral surface of a shaft hole 72, however, is structured such as to be fitted thereto via the cartridge 51 as mentioned above, in the installation structure.

The cartridge 51 is structured as follows.

The cartridge 51 is made of a predetermined rigid material such as a metal or the like, for example, constituted by a press molded product of a metal sheet, and has a small-diameter tube portion 52, an annular step portion 53 is integrally formed on a sealed fluid side end portion of the small-diameter tube portion 52 toward an outer side in a radial direction, a large-diameter tube portion 54 is integrally formed on an outer peripheral end portion of the step portion 53 toward the sealed fluid side A, and the cartridge 51 is structured such as to be fitted to an inner peripheral surface of the shaft hole 72 by an outer peripheral surface of the large-diameter tube portion 54, while the lip type seal 1 is fitted to an inner peripheral surface of the small-diameter tube portion 52, as illustrated.

In this case, the step portion 53 in the first embodiment mentioned above is formed in a flat shape orthogonal to the shaft, however, in the second embodiment, the step portion 53 is formed in an S-shaped cross sectional shape or an approximately S-shaped cross sectional shape, whereby the small-diameter tube portion 52 and the large-diameter tube portion 54 are arranged so as to partly overlap in the axial direction.

Further, the cartridge 51 is structured such that a diameter of the small-diameter tube portion 52 is set in a fixed size, and a diameter of the large-diameter tube portion 54 is set in conformity to a diameter of a shaft hole to be installed, at a time of manufacture thereof.

Further, the cartridge 51 is structured such that a radial gap 55 is set between the outer peripheral surface of the small-diameter tube portion 52 and the inner peripheral surface of the shaft hole 72 at a time when the cartridge 51 is fitted to the inner peripheral surface of the shaft hole 72 by the outer peripheral surface of the large-diameter tube portion 54.

Further, an outward flange-shaped engagement portion 56 for defining an insertion depth at a time of inserting the cartridge 51 to the shaft hole 72 is integrally formed on the sealed fluid side end portion of the large-diameter tube portion 54 in the cartridge 51.

Further, an outer peripheral seal 57 made of an elastic film is attached all around the periphery to the outer peripheral surface of the large-diameter tube portion 54 in the cartridge 51, the outer peripheral seal 57 being interposed between the cartridge 51 and the inner peripheral surface of the shaft hole 72 and carrying out a sealing operation.

Further, an inward flange-shaped engagement portion 58 for defining an insertion depth at a time of inserting the lip type seal 1 to the cartridge 51 is integrally formed on the atmospheric air side end portion of the small-diameter tube portion 52 in the cartridge 51.

The lip type seal 1 having the structure mentioned above has a plurality of seal lips 14 and 23 so as to achieve an excellent sealing effect, and the installation structure is characterized in a point that the following operation and effect can be achieved.

The installation structure having the constitution mentioned above is made such that the lip type seal 1 is installed to the inner periphery of the shaft hole 72 via the cartridge 51 arranged at the outer peripheral side of the lip type seal 1, and the cartridge 51 is formed in a stepped shape in which the large-diameter tube portion 54 is integrally formed with the small-diameter tube portion 52 via the step portion 53, and is fitted to the inner periphery of the shaft hole 72 by the outer peripheral surface of the large-diameter tube portion 54, while the lip type seal 1 is fitted to the inner peripheral surface of the small-diameter tube portion 52. Accordingly, it is possible to go on using the lip type seal 1 having a fixed specification as it is, and further, it is possible to install the lip type seal 1 to inner peripheries of shaft holes 72 having various magnitudes, by setting the diameter of the small-diameter tube portion 52 in a fixed size and setting the diameter of the large-diameter tube portion 54 in conformity to a diameter of a shaft hole to be installed, at a time of manufacturing the cartridge 51. Therefore, even in the case of using at installation positions having same shaft diameters but having different shaft hole diameters, it is possible to use the lip type seal 1 having the fixed specification as it is.

Further, since the radial gap 55 having a predetermined magnitude is set between the outer peripheral surface of the small-diameter tube portion 52 of the cartridge 51 and the inner peripheral surface of the shaft hole 72 in the installed state, it is possible to make effective use of the radial gap 55 as a space for the following of the lip type seal 1 to an eccentricity of the shaft 73, or a space for heat insulation to make heat hard to be transmitted to the lip type seal 1 from the housing 71.

Further, since the outward flange-shaped engagement portion 56 is integrally formed on the sealed fluid side end portion of the large-diameter tube portion 54 in the cartridge 51, it is possible to always define an insertion depth at a fixed depth by bringing the engagement portion 56 into contact with the outer end surface of the housing 71 at a time of inserting the cartridge 51 to the shaft hole 72. Accordingly, it is possible to make an installing work easy and it is possible to improve an installing workability.

Further, since the outer peripheral seal 57 constituted by the elastic membrane is attached to the outer peripheral surface of the large-diameter tube portion 54 in the cartridge 51, the outer peripheral seal 57 is interposed between the cartridge 51 and the inner peripheral surface of the shaft hole 72 so as to achieve a sealing operation. Accordingly, it is possible to secure and improve sealing performance of the portion.

Further, since the inward flange-shaped engagement portion 58 is integrally formed on the atmospheric air side end portion of the small-diameter tube portion 52 in the cartridge 51, it is possible to always define an insertion depth at a fixed depth by bringing the lip type seal 1 into contact with the engagement portion 58 at a time of inserting the lip type seal 1 to the cartridge 51. Accordingly, it is possible to make an assembling work easy, and it is possible to improve assembling workability.

Further, since the step portion 53 of the cartridge 51 is formed in the S-shaped cross sectional shape or the approximately S-shaped cross sectional shape, whereby the small-diameter tube portion 52 and the large-diameter tube portion 54 are arranged so as to partly overlap in the axial direction, an overall length in the axial direction of the cartridge 51 is shortened by a partly overlapping amount. Accordingly, it is possible to provide a seal product which is structured compact in the axial direction even in the structure in which the lip type seal 1 is installed via the cartridge 51.

In this case, the structure of the lip type seal 1 in the above description is only an exemplification, and in accordance with the present invention, it is possible to install lip type seals having various structures to the housing via the cartridge.

What is claimed is:

1. An installation structure which is installed to an inner periphery of a shaft hole provided in a housing, comprising:
    a lip seal slidably in close contact with a peripheral surface of a shaft inserted to said shaft hole; and
    a cartridge arranged on an outer peripheral side of said lip seal,
    wherein said lip seal includes a first lip seal member, a second lip seal member, a backup ring, and a retaining ring;
    said first lip seal member having:
        an integrally formed cylinder portion;
        an annular radial portion integrally formed from an end portion of said cylinder portion, said annular radial portion being at a sealed fluid side of said lip seal and being located toward an inner side of said cylinder portion in a radial direction of said first lip seal member; and
        a first seal lip portion integrally formed on an inner peripheral end portion of said radial portion, said first seal lip portion extending toward said sealed fluid side, and
    said second lip seal member having:
        an annular flat surface portion; and
        a second seal lip portion integrally formed on an inner peripheral end portion of said annular flat surface portion so as to slope toward said sealed fluid side,
    said backup ring having an annular flat shape and being arranged further toward an atmospheric air side of said lip seal than said second lip seal member so as to back up said second lip seal member, and
    said retaining ring having:
        an integrally formed tubular portion;
        a fold-back portion provided continuously to a sealed fluid side end portion of said tubular portion;
        an inward flange portion provided continuously to said fold-back portion; and
        a caulking portion provided on an atmospheric air side end portion of said tubular portion,
    said cylinder portion of said first lip seal member being arranged at an outer peripheral side of said tubular portion of said retaining ring, and said second seal lip member and said backup ring being caulked and fixed between said inward flange portion and said caulking portion of said retaining ring, and
    said cartridge having:
        a small-diameter tube portion;
        an annular step portion integrally formed on a sealed fluid side end portion of said small-diameter tube portion toward an outer side of said small-diameter tube portion in a radial direction;
        a large-diameter tube portion integrally formed on an outer peripheral end portion of said annular step portion toward said sealed fluid side, said annular step portion having an S-shaped cross sectional shape, or an approximately S-shaped cross sectional shape, so that said small-diameter tube portion and said large-diameter tube portion partly overlap in an axial direction of said cartridge, and
    said cartridge being fitted to an inner peripheral surface of said shaft hole at an outer peripheral surface of said large-diameter tube portion, while said lip seal is fitted to an inner peripheral surface of said small-diameter tube portion.

2. An installation structure as claimed in claim 1, wherein the cartridge integrally has an outward flange shaped engagement portion for defining an insertion depth when the cartridge is inserted to the shaft hole on an end portion in an axial direction of the large-diameter tube portion, and said cartridge integrally has an inward flange shaped engagement portion for defining an insertion depth when the lip seal is inserted to the cartridge on an end portion in an axial direction of the small-diameter tube portion, and a gap in a radial direction is set between the outer peripheral surface of the small-diameter tube portion and the inner peripheral surface of the shaft hole when the cartridge is fitted to the inner peripheral surface of the shaft hole by the outer peripheral surface of the large-diameter tube portion.

3. An installation structure as claimed in claim 1, wherein the cartridge has an outer peripheral seal constructed by an elastic membrane interposed between the cartridge and the inner periphery of the shaft hole to serve for a sealing operation, on the outer peripheral surface of the large-diameter tube portion.

4. An installation structure as claimed in claim 2, wherein the cartridge has an outer peripheral seal constructed by an elastic membrane interposed between the cartridge and the inner periphery of the shaft hole to serve for a sealing operation, on the outer peripheral surface of the large-diameter tube portion.

* * * * *